United States Patent [19]
Young

[11] 3,873,908
[45] Mar. 25, 1975

[54] SELF-OSCILLATING OPTICALLY PUMPED MAGNETOMETER HAVING AUTOMATIC PHASE CORRECTION

[75] Inventor: Byron A. Young, Palo Alto, Calif.
[73] Assignee: Varian Associates, Palo Alto, Calif.
[22] Filed: Dec. 17, 1973
[21] Appl. No.: 425,377

Related U.S. Application Data
[63] Continuation of Ser. No. 361,081, May 17, 1973, abandoned.

[52] U.S. Cl. .............................. 324/.5 R, 324/.5 F
[51] Int. Cl. ........................................... G01r 33/08
[58] Field of Search .................. 324/.5 R, .5 F, .5 E

[56] References Cited
UNITED STATES PATENTS
| | | | |
|---|---|---|---|
| 3,158,803 | 11/1964 | Bell | 324/0.5 F |
| 3,187,251 | 6/1965 | Bell | 324/0.5 F |
| 3,256,500 | 6/1966 | Arnold | 324/0.5 F |

OTHER PUBLICATIONS
Bloom, A. L., Principles of Operation of the Rubidium Vapor Magnetometer, App. Optics, Vol. 1, No. 1, Jan. 1962, pp. 61–68.

Farthing et al., Rubidium Vapor Magnetometer For Near Earth Orbiting Spacecraft, Rev. of Scien. Inst., Vol. 38, No. 8, August 1967, pp. 1,023–1,030.

*Primary Examiner*—Robert J. Corcoran
*Attorney, Agent, or Firm*—Stanley Z. Cole; Gerald M. Fisher

[57] ABSTRACT

In a dual cell optically pumped cross coupled self-oscillating magnetometer, orientation dependent phase shift, i.e., heading errors, are reduced by phase modulating the self-oscillating frequency to produce a corresponding amplitude modulation in the Zeeman resonance of each of the two cells. This amplitude modulation of the Zeeman resonance is a function of the corresponding slope of the respective overlapping Zeeman resonance lines at the self-oscillating frequency. The two Zeeman resonance amplitude modulation signals are compared to derive a difference error signal which is utilized for adjusting the phase shift of the self-oscillating frequency to correspond to an overlap frequency of the two Zeeman resonance lines wherein both Zeeman lines have the same slope, thereby automatically minimizing heading errors.

7 Claims, 3 Drawing Figures

SELF-OSCILLATING OPTICALLY PUMPED MAGNETOMETER HAVING AUTOMATIC PHASE CORRECTION

This is a continuation of application Ser. No. 361,081, filed May 17, 1973 and now abandoned.

BACKGROUND OF THE INVENTION

The invention relates in general to an optically pumped magnetometer and more particularly to an improved self-oscillating magnetometer having automatic phase correction.

DESCRIPTION OF THE PRIOR ART

Heretofore, dual cell optically pumped cross coupled self-oscillating magnetometers have been constructed. In such a system, the magnetometer self-oscillates at a frequency corresponding to an overlap of the two Zeeman resonance lines of the two optically pumped cells. For a condition of zero phase shift for the Zeeman resonance electrical signals around the closed oscillatory loop, the self-oscillating frequency will correspond to an overlap point of the two Zeeman resonance lines where each line has the same slope. However, for conditions of non-zero phase shift around the closed electrical oscillating loop the self-oscillating frequency will be closer to the center of one of the Zeeman resonance lines than to the other and as a result there is an error in the self-oscillating frequency and thus an error in the measurement of the magnetic field.

Phase shifts can be introduced into the electrical oscillating loop by slight optical misalignments in one of the cells or by misalignment of the RF coil. The alignment errors result from the inability to make the optical and RF axes perfectly parallel and also from inhomogeneities in the RF field direction and imperfection in the optical components which reduce symmetry about the optical axis. A dual cell cross coupled self-oscillating optically pumped magnetometer of the prior art is disclosed and claimed in U.S. Pat. No. 3,256,500 issued June 14, 1966 and assigned to the same assignee as the present invention.

Despite their alignment problems, self-oscillating optically pumped magnetometers are often preferred over swept-type optically pumped magnetometers because of their lower inherent noise, their faster response to rapid field changes, and their fast recovery from an interruption in operation.

SUMMARY OF THE PRESENT INVENTION

The principal object of the present invention is the provision of an improved optically pumped self-oscillating magnetometer and more particularly to the provision of means for automatically subtracting out all undesirable electronically and optically produced phase shifts to obtain a minimum heading error.

In one feature of the present invention, the self-oscillating frequency is frequency or phase modulated to derive outputs corresponding to the respective slopes of the Zeeman resonance lines in each of the cells at the self-oscillating frequency. These outputs are compared to derive an error signal for controlling the phase of the self-oscillating frequency such that, at the self-oscillating frequency, both of the overlapping Zeeman resonance lines have the same slope, thereby minimizing heading error.

In another feature of the present invention, the amplitude modulation in each of the detected Zeeman resonance signals, as produced by phase modulation of the self-resonant frequency, are compared to derive a difference signal at the modulation frequency. This difference frequency is phase compared with a sample of the modulation frequency to derive a dc error signal utilized for controlling the phase of the self-oscillating frequency, whereby the self-oscillating frequency is automatically controlled to a value corresponding to equal slopes of the Zeeman resonance lines.

Other features and advantages of the present invention will become apparent upon a perusal of the following specification taken in connection with the accompanying drawings wherein:

DESCRIPTION OF THE PREFERRED EMBODIMENTS

Figure 1:
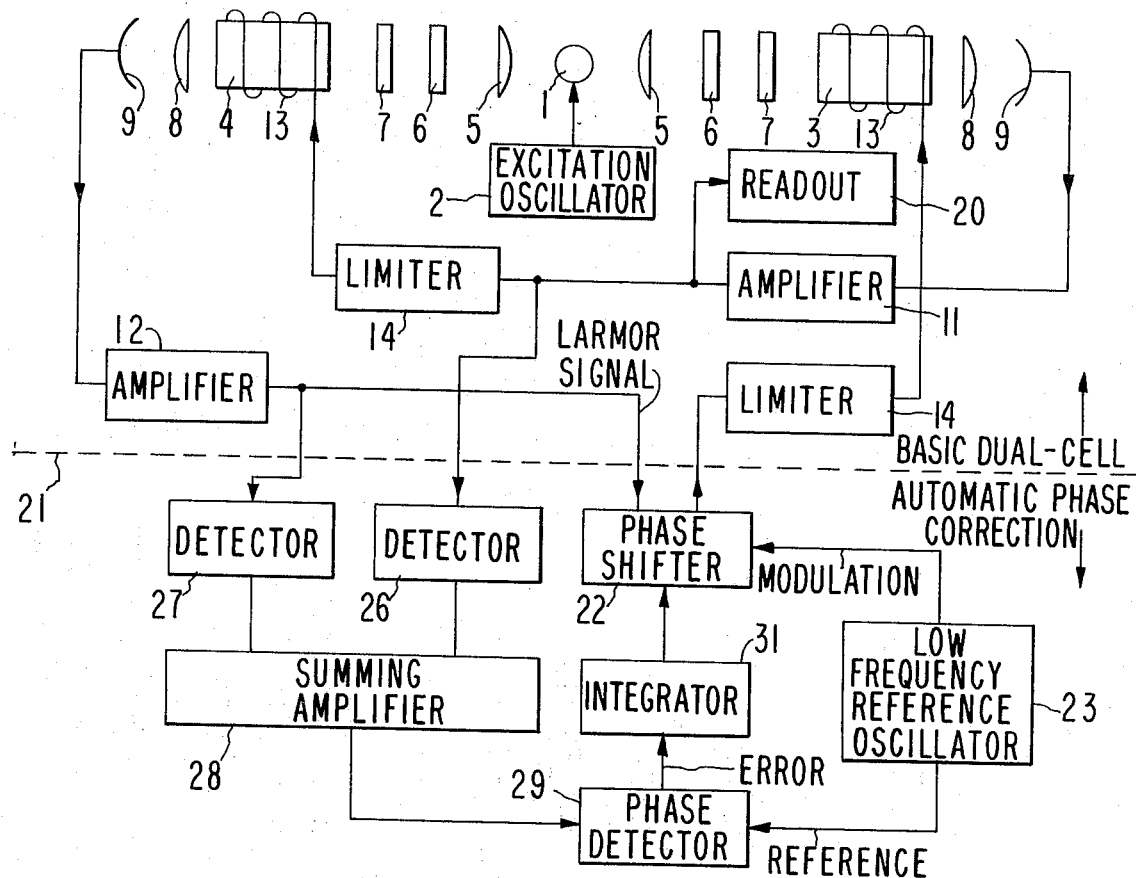
FIG. 1 is a schematic block diagram of a self-oscillating optically pumped magnetometer incorporating features of the present invention.

Referring now to FIG. 1, there is shown a dual cell cross-coupled self-oscillating optically pumped magnetometer incorporating features of the present invention. The magnetometer is essentially the same as that disclosed and claimed in the aforecited U.S. Pat. No. 3,256,500 and the disclosure of said patent is hereby incorporated by reference for a more complete detail description of the magnetometer per se.

Briefly, the magnetometer includes an electrodeless discharge lamp 1 excited with RF from an excitation oscillator 2. The discharge lamp bulb 1 is filled with natural rubidium vapor mixed with a starting medium such as krypton gas. The lamp is described in detail in U.S. Pat. No. 3,109,960 granted Nov. 5, 1963. The optical pumping light emanating from the lamp is oppositely directed through a first and second absorption cell 3 and 4, respectively. Each of the oppositely directed light beams successively passes through a collimating lens 5 and interference filter 6 which suppresses the 7,800 angstrom $D_2$ line while passing the 7948 angstrom $D_1$ line, thereby enhancing optical pumping in the absorption cells 3 and 4. A circular polarizer 7 is provided ahead of each of the absorption cells for effecting differential sub-level absorption within the cells 3 and 4 for optical pumping thereof.

The absorption cells 3 and 4 contain rubidium vapor which is preferably isotopically enriched with respect to either rubidium–85 or rubidium–87, mixed with a buffer gas such as neon to reduce disorienting wall collisions, thereby providing long relaxation times and consequently narrow line width required for high sensitivity. In the case of rubidium–85, the polarized and filtered light beam will be modulated at a precession frequency (Zeeman resonance frequency) of approximately 4.66 cycles per gamma of the magnetic field being measured, and in the case of rubidium–87 the precession frequency is approximately 7.00 cycles per gamma (1 gamma = $10^{-5}$ gauss). For example, in an average earth's field of 0.5 gauss, the precession frequency of rubidium–85 is about 233 kHz.

This intensity modulated light beam, in passing through the corresponding absorption cell 3 or 4, is focused by a focusing lens 8 onto a respective photocell 9. The intensity modulation of the light striking the photo detector cell 9 is converted by the photocells 9 to an alternating electrical signal of the same frequency. The a.c. electrical signals are respectively amplified by amplifiers 11 and 12 and fed back in cross-coupled relation to the absorption cells 4 and 3, respectively, through oppositely wound coaxial RF coils 13 in the form of an alternating magnetic field. This RF magnetic field maintains forced precession of the rubidium atoms, thereby effecting self-sustained oscillation at a frequency proportional to the intensity of the unidirectional magnetic field being measured. Limiters 14 are provided between each of the amplifiers 11 and 12 and the corresponding RF coil 13 for limiting the amplitude of the feedback cross-coupled electrical signals.

A sample of the self-oscillating frequency is taken from the output of amplifier 11 and fed to a readout 20 such as a counter or the like for giving an output proportional to the intensity of the magnetic field.

Figure 2:
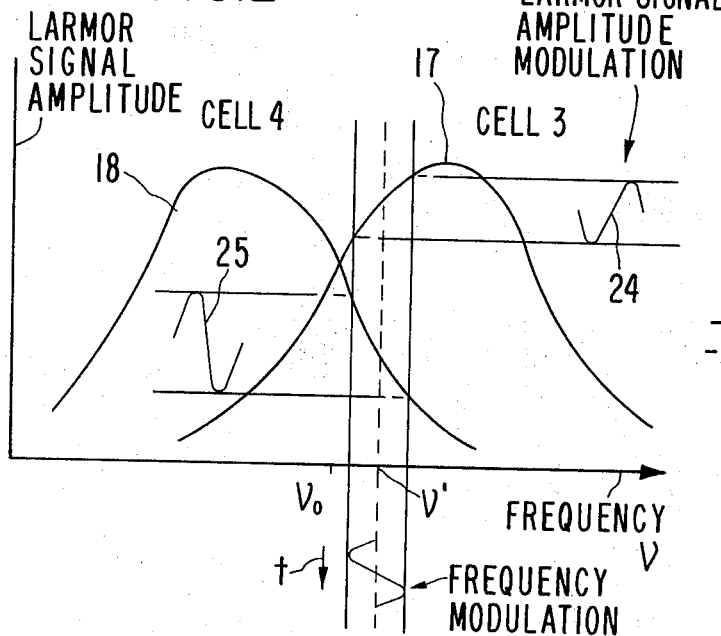
FIG. 2 is a plot of Larmor signal amplitude (Zeeman resonance line amplitude) vs. frequency showing the two Zeeman resonance lines for the respective cells of the dual cell magnetometer of FIG. 1.

Referring now to FIG. 2 there is shown the Zeeman or Larmor resonance line envelopes 17 and 18, respectively, for the quantum systems (rubidium atoms) of cells 3 and 4, respectively. The magnetometer will oscillate at a self-oscillating frequency corresponding to an overlap of the envelopes 17 and 18 for the two cells 3 and 4, respectively. For the special case where there is zero electronic and/or optical phase shift around the closed oscillating loop, the self-oscillating frequency will occur at $\nu_0$ where both lines 17 and 18 have the same absolute value of slope. However, due to the great difficulty in achieving precise RF and optical alignment in the two absorption cells 3 and 4, the phase shift is generally not zero around the loop and therefore the self-oscillating frequency will occur at a point such as $\nu'$ where the slope of the two envelopes 17 and 18 are not equal. Since the undesired phase shifts in the oscillatory loop are dependent upon orientation of the cells 3 and 4 in the magnetic field to be measured, there is produced an undesired heading error which it is desired to eliminate.

Figure 3:
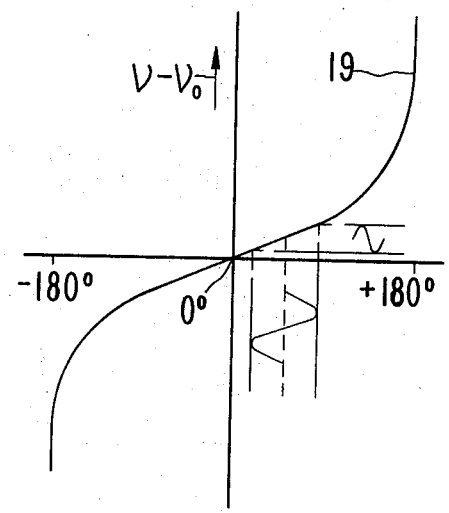
FIG. 3 is a plot of self-oscillating frequency versus phase shift introduced by the electronics and optical misalignments in the magnetometer system of FIG. 1.

Referring now to FIG. 3 there is shown a plot of $\nu' - \nu_0$ (heading error) versus phase shift around the oscillatory loop. The heading error is plotted as curve 19 as a function of the phase shift.

Referring again to FIG. 2 it is seen that a frequency (phase) modulation superimposed upon the self-oscillating frequency $\nu'$ produces amplitude modulation signals in each of the detected Zeeman resonance line signals. The amplitudes of the intensity modulation signals are proportional to the slope of the respective Zeeman resonance line envelopes at the self-oscillating frequency. Thus, in the present invention, the intensity modulation signals will be compared to derive a difference signal and the difference signal will be utilized for adjusting the phase shift around the closed oscillatory loop, such that the total phase shift encountered around the oscillatory loop, i.e., that produced by the optical and electronic misalignments will be cancelled by an electronic phase shift introduced into the loop such that the self-oscillating frequency will be corrected to a frequency corresponding to $\nu_0$, thereby greatly minimizing undesired heading errors due to electronic and optical misalignment.

Referring again to FIG. 1, the automatic phase correction portion of the circuit is shown below the dotted line 21. A voltage variable phase shifter 22 is connected in series with the closed oscillatory Zeeman resonance loop by connecting the phase shifter between amplifier 12 and limiter 14. A low frequency reference oscillator 23 having a frequency lower than each of the half-power bandwidth of the Zeeman resonance envelopes feeds a modulation signal as of 30 Hz, into phase shifter 22 for modulating the phase (frequency) of the self-oscillating signal in the closed electrical loop.

This phase modulation produces a corresponding frequency modulation of the self-oscillating frequency which in turn produces corresponding amplitude modulation of each of the Zeeman resonance signals detected in detectors 9 as shown by signals 24 and 25 of FIG. 2. These AM signals 24 and 25 are sampled from the output of amplifiers 11 and 12 respectively, and fed to the input of respective AM detectors 26 and 27 for separating the corresponding modulation components 24 and 25 from the self-oscillating signal. The detected AM signals 24 and 25 are fed into a summing amplifier 28 wherein they are summed in 180° out of phase relation to derive a difference output at the modulation frequency of reference oscillator 23.

The difference signal output of summing amplifier 28 is fed to one input of a phase detector 29 for phase detection against a sample of the modulation signal derived from reference oscillator 23 to derive a dc error signal having an amplitude corresponding to the magnitude of the frequency difference between the self-oscillating frequency $\nu'$ and the desired self-oscillating frequency $\nu_0$ and having a sign (phase) either + or − dependent upon whether $\nu'$ is above or below the frequency of the desired $\nu_0$.

The error signal is fed to an integrator 31 which integrates the error signal to derive a voltage ramp which is fed to the phase shifter 22 to shift the phase of the self-oscillating signal in a direction dictated by the error voltage polarity until the desired phase shift in the remainder of the loop has been subtracted out. At this point, $\nu'$ will equal $\nu_0$ and the two intensity modulation signals 24 and 25 will have equal amplitudes and their sum will be zero resulting in no further shift of the electronic phase in the closed Zeeman resonance loop.

In operation, assuming an initial phase shift or setting for phase shifter 22 of zero degrees, the magnetometer requires only several milliseconds to start oscillating at a frequency which will be in error only by the residual heading error plus the result of small electronic phase shifts. The portion of the frequency error produced by electronic phase shift and misalignment effects will be corrected at a later time determined by the time constant of the correction loop. Since the correction loop need only respond at a rate comparable to the rate of rotation of the magnetometer, the bandwidth of the loop can be restricted to a fraction of a hertz to minimize the introduction of noise. Unlike the swept magnetometer, narrow banding the correction will not reduce the magnetometer's response time to rapid field changes.

An undesirable feature of the above phase correction loop is the frequency modulation introduced into the self-oscillating frequency which is to be read out by readout 20. If a direct analog recorder is utilized as readout 20, a low pass filter can be used to reject the modulation frequency such that the readout does not respond to the modulation frequency. If a frequency counter is used, the low frequency reference oscillator 23 can be replaced by signals from the counter, the signal from the counter in such a case would be a convenient harmonic of the gate period reciprocal utilized inside the counter. In this manner, an integral number of phase modulation cycles will occur during the count so that the undesired frequency modulation in the self-oscillating frequency will be averaged to zero by the counter 20. If a period measurement of the Larmor frequency is made, the same averaging can be obtained by using a divided down Larmor signal to replace the reference oscillator 23. For a typical period measurement, the count is actually made for a large number of signal periods. The total count is dependent upon the time interval between the first and the last signal zero crossing. If an integral number of frequency modulation cycles occur during this count interval, the modulation will not affect the relative time spacing of the first and last zero crossing.

The Zeeman resonance vapor (quantum systems) need not be limited to rubidium vapor but may comprise other resonators such as Cs, K and other quantum system resonators which exhibit magnetic field dependent quantum transitions.

What is claimed is:

1. In an optically pumped magnetometer:

means having first and second optical absorption volumes, each containing an assemblage of quantum systems which may precess in a unidirectional magnetic field at a rate which is determined by the intensity of said field;

means for directing optical radiation to said absorption volumes with such spectral characteristics as to be differentially absorbed with respect to the magnetic sub-levels of said quantum systems, whereby the intensity of the optical radiation received from each volume is intensity modulated at a frequency which depends on said precession rate;

means for converting the intensity modulation of the radiation received from said absorption volumes into alternating electrical signals;

means for cross-coupling the alternating electrical signal derived from each absorption volume to the other absorption volume in the form of an alternating magnetic field which produces forced precession of said quantum systems, thereby effecting self-sustained oscillation of said electrical signals at a frequency determined by the intensity of said unidirectional magnetic field and at a frequency corresponding to an overlap of the envelopes of the resonance lines of said first and second quantum systems, each of said resonance lines corresponding to slightly different center frequency precessional rates in each of said volumes; and phase control means for causing said overlap frequency of oscillation to occur at a frequency corresponding to substantially equal slope for the envelopes of each of said overlapping resonance lines, said phase control means including, means for modulating the phase of said self-oscillating frequency at a modulation frequency to effectuate a corresponding amplitude modulation in each of said first and second alternating electrical signals derived from each of said absorption volumes, means for comparing said amplitude modulation signals to derive an error signal proportional to the difference in slope of the first and second resonance lines at the self-oscillating frequency, and means for shifting the phase of said self-oscillating signal in response to said error signal to cause said self-oscillation frequency to occur at a frequency corresponding to equal slopes of said first and second resonance line envelopes.

2. The apparatus of claim 1 wherein said means for comparing said amplitude modulation signal to derive said error signal includes, means for comparing the amplitudes of said first and second modulation signals to derive a difference output at the modulation frequency with an amplitude determinative of the difference in amplitudes between said first and second modulation signals and a phase determinative of which one of said resonance envelopes at said self-oscillating frequency has the largest slope, and means for comparing said difference output with a sample of said modulation frequency employed to modulate said phase of said self-oscillation frequency to derive said error signal.

3. The apparatus of claim 1 wherein said modulation frequency is less than the half power bandwidth of both of said first and second overlapping resonance line envelopes.

4. The apparatus of claim 2 including means for integrating said error signal, and means for applying said integrated error signal to said phase modulator means for shifting the frequency of said self-oscillating frequency.

5. In an optically pumped magnetometer:

means having first and second optical absorption volumes, each containing an assemblage of quantum systems which may precess in a unidirectional magnetic field at a rate which is determined by the intensity of said field;

means for directing optical radiation to said absorption volumes with such spectral characteristics as to be differentially absorbed with respect to the magnetic sub-levels of said quantum systems, whereby the intensity of the optical radiation received from each volume is intensity modulated at a frequency which depends on said precession rate;

means for converting the intensity modulation of the radiation received from said absorption volumes into alternating electrical signals;

means for cross-coupling the alternating electrical signal derived from each absorption volume to the other absorption volume in the form of an alternating magnetic field which produces forced precession of said quantum systems, thereby effecting self-sustained oscillation of said electrical signals at a frequency determined by the intensity of said unidirectional magnetic field and at a frequency corresponding to an overlap of the envelopes of the resonance lines of said first and second quantum systems, each of said resonance lines corresponding to slightly different center frequency precessional rates in each of said volumes; and phase control means for causing said overlap frequency of oscillation to occur at a frequency corresponding to substantially equal slope for the envelopes of each of said overlapping resonance line by introducing a compensating phase shift into said cross coupling means to cancel phase shifts introduced by physical misalignments or unequal frequency-phase characteristics in said means for cross coupling.

6. Method for eliminating heading errors in a self-oscillating cross-coupled two-cell optically-pumped, optically-monitored magnetometer, the improvement comprising determining and inserting a compensating phase shift into the cross coupling loop to cause the overlap frequency of oscillation to occur at a frequency corresponding to substantially equal slope for the envelopes of each overlapping resonance line.

7. The method of claim 6 wherein the step of determining and inserting a compensating phase shift includes:

modulating the phase of the self-oscillating frequency;

comparing amplitude modulation signal outputs of each cell to derive an error signal proportional to the difference in slope of the first and second resonance lines at the self-oscillating frequency; and shifting the phase of the self-oscillating signal in response to said error signal thereby causing the overlap frequency to occur at a frequency corresponding to substantially equal slope for the envelopes of each overlapping resonance line.

* * * * *